United States Patent
Elrom et al.

(10) Patent No.: US 8,321,610 B2
(45) Date of Patent: *Nov. 27, 2012

(54) METHODS OF MULTI-SERVER APPLICATION SYNCHRONIZATION WITHOUT STOPPING I/O

(75) Inventors: Ofer Elrom, Gilboa (IL); Eran Raichstein, Yokneam Ilit (IL); Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,112

(22) Filed: Sep. 29, 2011

(65) Prior Publication Data

US 2012/0023068 A1    Jan. 26, 2012

Related U.S. Application Data

(63) Continuation of application No. 12/365,051, filed on Feb. 3, 2009, now Pat. No. 8,108,575.

(51) Int. Cl.
*G06F 3/00* (2006.01)
(52) U.S. Cl. ............... 710/61; 710/58; 710/60; 709/248
(58) Field of Classification Search .................. None
See application file for complete search history.

(56) References Cited

U.S. PATENT DOCUMENTS

| | | | |
|---|---|---|---|
| 5,854,754 A | 12/1998 | Cabrera et al. | |
| 6,157,971 A | 12/2000 | Gates | |
| 7,181,583 B2 | 2/2007 | Saika | |
| 7,321,907 B2 | 1/2008 | Tsuchida et al. | |
| 7,386,575 B2 | 6/2008 | Bashant et al. | |
| 7,421,614 B2 | 9/2008 | Watanabe | |
| 7,437,388 B1 | 10/2008 | DeVos | |
| 7,930,359 B2 | 4/2011 | Elrom et al. | |
| 8,108,575 B2 | 1/2012 | Elrom et al. | |
| 2004/0153615 A1 | 8/2004 | Koning et al. | |
| 2004/0215666 A1 | 10/2004 | Hrle et al. | |

(Continued)

FOREIGN PATENT DOCUMENTS

EP    1 677 192 A3    2/2009

OTHER PUBLICATIONS

International Search Report and Written Opinion from PCT Application No. PCT/EP2009/067266 dated Mar. 19, 2010.

(Continued)

*Primary Examiner* — Chun-Kuan Lee
*Assistant Examiner* — Dayton Lewis-Taylor
(74) *Attorney, Agent, or Firm* — Zilka-Kotab, PC (57) ABSTRACT

A method according to one embodiment includes receiving a request to perform a backup of data associated with an application running on multiple servers; communicating with I/O Handlers on the servers for initiating a coordinated backup operation on the data at about a same start time; and instructing the I/O Handlers to stretch communication between instances of the application and data storage volumes associated therewith during initiating the backup operation. Additional systems, methods, and computer program products are also disclosed.

23 Claims, 2 Drawing Sheets

U.S. PATENT DOCUMENTS

| | | | |
|---|---|---|---|
| 2007/0033294 A1 | 2/2007 | Ungermann et al. | |
| 2007/0088737 A1 | 4/2007 | Kawakami et al. | |
| 2007/0214196 A1 | 9/2007 | Garimella et al. | |
| 2007/0239950 A1 | 10/2007 | Kern et al. | |
| 2008/0104317 A1 | 5/2008 | Stewart | |
| 2011/0078115 A1 | 3/2011 | Elrom et al. | |
| 2011/0080840 A1* | 4/2011 | Patel et al. | 370/252 |

OTHER PUBLICATIONS

Office Communication from European application No. 09801961.5 dated Jun. 17, 2011.

Non-Final Office Action Summary from U.S. Appl. No. 12/365,051 dated Mar. 29, 2011.

Notice of Allowance and Fee(s) Due from U.S. Appl. No. 12/365,051 dated Sep. 21, 2011.

\* cited by examiner

METHODS OF MULTI-SERVER APPLICATION SYNCHRONIZATION WITHOUT STOPPING I/O

RELATED APPLICATIONS

This application is a continuation of U.S. patent application Ser. No. 12/365,051 filed Feb. 3, 2009, and which is herein incorporated by reference.

BACKGROUND

The present invention relates generally to an improved data processing system and method, and more specifically to methods for protecting business data using application synchronization across multiple servers.

Protection of business data is a critical part of modern Information Technology (IT) operations. Business data comes in many forms and is managed by a wide variety of business applications including databases, file systems, email applications, online transaction systems, etc. There are a wide variety of data protection systems, methods and techniques for protecting this business data and the business applications that manage that data. These systems, methods, and techniques for data protection include traditional file backups, image backup techniques, storage hardware replication functions, snapshotting, continuous data protection, mirroring, and the like.

Modern business applications and their associated business data are increasingly spread across multiple servers, enabling higher scalability and performance of the applications. In modern application architectures, these applications and data may even be spread across local, regional, national, or in some cases, even global distances. This presents very significant challenges to existing systems, methods and techniques for data protection. One of the most significant challenges this presents is the synchronization of the various components of the application and its associated data in order to obtain a data copy with a consistent view of the application and its data. Without a consistent view of the application and data at some point in time, there is a chance that the application and its data will not be able to be recovered without some level of application or data corruption. This is often due, for example, to inflight transactions that are not complete. This is a problem with any application, even single server applications. Applications that span multiple volumes and multiple servers, especially across distances, present an even more daunting challenge.

One set of prior art in this area is the use of hardware or software snapshotting of volumes, and the grouping of volumes into consistency groups that are replicated together as a group to guarantee their synchronization. One of the key problems with the hardware snapshot solutions approach is that these are implemented at the storage hardware or storage network level and are thus unaware of any required application affinity. The software snapshotting solutions also require additional synchronization with applications as described below.

A solution that brings together the benefits of storage hardware, software, and application-based snapshotting technologies would be advantageous. A solution is sought that can take efficient and consistent snapshots of applications and application data, even across multiple storage devices across a single or multiple servers, and perform in a way that minimizes or eliminates application awareness and downtime, and avoids some of the inherent inefficiencies of some application interfaces.

SUMMARY

A method according to one embodiment includes receiving a request to perform a backup of data associated with an application running on multiple servers; communicating with I/O Handlers on the servers for initiating a coordinated backup operation on the data at about a same start time; and instructing the I/O Handlers to stretch communication between instances of the application and data storage volumes associated therewith during initiating the backup operation.

A method according to another embodiment includes receiving a request to perform a backup of data associated with an application running on multiple servers; and instructing I/O Handlers on the servers to initiate a coordinated backup operation on the data at about a same start time, wherein the I/O Handlers stretch communication between instances of the application and data storage volumes associated therewith during initiating the backup operation.

A computer program product according to yet another embodiment includes a computer usable medium having computer usable program code embodied therewith. The computer usable program code comprises computer usable program code configured to computer usable program code configured to communicate with I/O Handlers on the servers for initiating a coordinated backup operation on the data at about a same start time; and computer usable program code configured to instruct the I/O Handlers to stretch communication between instances of the application and data storage volumes associated therewith during initiating the backup operation.

A system according to one embodiment includes a processor and a computer usable medium, the computer usable medium having computer usable program code embodied therewith, which when executed by the processor causes the processor to: communicate with I/O Handlers on the servers for initiating a coordinated backup operation on the data at about a same start time; and instruct the I/O Handlers to stretch communication between instances of the application and data storage volumes associated therewith during initiating the backup operation.

A system according to another embodiment includes a backup server for communicating with I/O Handlers on the servers for initiating a synchronized backup operation of data associated with an application running on the servers at about a same point in time, a start time of the synchronized backup operation being based at least in part on the time difference synchronizations calculated by the time synchronizer server, wherein the backup server includes computer code for instructing the I/O Handlers to stretch communication between instances of the application and data storage volumes associated therewith during initiating the backup operation.

Any of these embodiments may be implemented in any storage devices, such as solid state drives (SSD), Flash memories, magnetic data storage systems such as a tape drive system, optical devices, network storage devices, virtualized storage devices, etc.

Other aspects and embodiments of the present invention will become apparent from the following detailed descrip-

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Application-provided synchronization across multiple servers has been attempted by others, but these approaches are deficient in that they are implemented at the application level, they are application specific and do not apply to other applications, they typically require writing to application APIs, and they usually entail a performance cost. In addition, host based volume replication solutions exist but do not synchronize replications across multiple volumes on multiple systems.

Despite interest in this area, few applications have enabled themselves with synchronization checkpoints and interfaces, even for single server implementations of the application. With multiple server implementations of applications it is even rarer to find effective and efficient synchronization checkpoint interfaces. In some cases, prior art requires a full shutdown of the application, followed by a full backup of the application, followed by a restart of the application. This is unacceptable in most business critical environments. In addition, it is very difficult to do this across multiple servers. Furthermore, even in the cases where applications allow for synchronization, and data protection solutions use those interfaces, there are still significant inefficiencies in this approach. For example, data protection schemes are at the mercy of the applications to provide these interfaces, and these interfaces are often unavailable and when available, often they are very inefficient (e.g., slow performing). Finally, hardware mirroring and replication solutions are typically focused on continuous business operations and cannot recover from corruption problems that require recovery to a previous point in time.

Embodiments of the present invention overcome the foregoing disadvantages.

The following description discloses systems and methods for protecting business and/or other types of data using application synchronization across multiple storage devices across a single or multiple servers.

An "I/O Handler" as used herein may be any Volume driver, Disk driver, I/O filter driver, etc., which can effectively freeze or stretch input and output operations, and can initiate a backup operation of data on all volumes, disks, drives, etc., for which the I/O Handler is associated with.

An "application," as used herein, may be made up of several application instances running on one or more machines, servers, etc., each application instance keeping some kind of data consistency between the data that it manages and the combination of all application instances together make up the application. Also, an application may have many different operations, parts, and/or activities (such as indexing, database and web interface, etc.) and each part, operation, and/or activity may be working from a different machine. All of these application parts, operations, and/or activities together make up the application.

A "snapshot" as used herein refers to any point in time backup, such as a point in time backup made from a hardware snapshot, software snapshot, or any other point in time backup mechanism.

In one general embodiment, a method includes receiving a request to perform a backup of data associated with an application running on multiple servers; communicating with I/O Handlers on the servers for initiating a coordinated backup operation on the data at about a same start time; and instructing the I/O Handlers to stretch communication between instances of the application and data storage volumes associated therewith during initiating the backup operation.

In another general embodiment, a method includes receiving a request to perform a backup of data associated with an application running on multiple servers; and instructing I/O Handlers on the servers to initiate a coordinated backup operation on the data at about a same start time, wherein the I/O Handlers stretch communication between instances of the application and data storage volumes associated therewith during initiating the backup operation.

In one general embodiment, a computer program product includes a computer usable medium having computer usable program code embodied therewith. The computer usable program code comprises computer usable program code configured to computer usable program code configured to communicate with I/O Handlers on the servers for initiating a coordinated backup operation on the data at about a same start time; and computer usable program code configured to instruct the I/O Handlers to stretch communication between instances of the application and data storage volumes associated therewith during initiating the backup operation.

In one general embodiment, a system includes a processor and a computer usable medium, the computer usable medium having computer usable program code embodied therewith, which when executed by the processor causes the processor to: communicate with I/O Handlers on the servers for initiating a coordinated backup operation on the data at about a same start time; and instruct the I/O Handlers to stretch communication between instances of the application and data storage volumes associated therewith during initiating the backup operation.

In another general embodiment, a system includes a backup server for communicating with I/O Handlers on the servers for initiating a synchronized backup operation of data associated with an application running on the servers at about a same point in time, a start time of the synchronized backup operation being based at least in part on the time difference synchronizations calculated by the time synchronizer server, wherein the backup server includes computer code for instructing the I/O Handlers to stretch communication between instances of the application and data storage volumes associated therewith during initiating the backup operation.

As will be appreciated by one skilled in the art, the present invention may be embodied as a system, method or computer program product, Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device, Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RE, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Disclosed are methods that perform snapshots by efficient copying of new and changed blocks and using a novel method of application synchronization across multiple servers using I/O Handlers, such as Volume drivers, Disk drivers, I/O filter drivers, etc.

Specifically, disclosed herein are several embodiments including a data protection system and method that includes I/O level, point in time synchronization across multiple I/O Handlers running on different production servers for application data consistent synchronization across multiple storage devices and multiple servers without application integration.

Another embodiment includes a data protection system and method that coordinates a multiplicity of I/O Handlers running on different production servers with a Time Synchronization Module to achieve a consistent backup of an application running across multiple storage devices and multiple servers, without requiring freezing of I/O.

Yet another embodiment comprises a consistent point in time snapshot of application data taken across multiple storage devices and multiple servers over Local Area Network (LAN) or Wide Area Network (WAN) distances without interfacing with the application at the multi-server level.

Another approach includes a consistent point in time snapshot of application data taken across multiple storage devices across multiple servers including locally attached disks, direct attached disks, and Storage Area Network (SAN) attached disks.

Yet another approach includes a method of determining the extent of time differences between two different servers through analysis of time queries that include communications latencies.

A further embodiment includes a method to synchronize between maximal possible time differences and communications latencies between a group of hosts and the I/O requests that these hosts generate.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
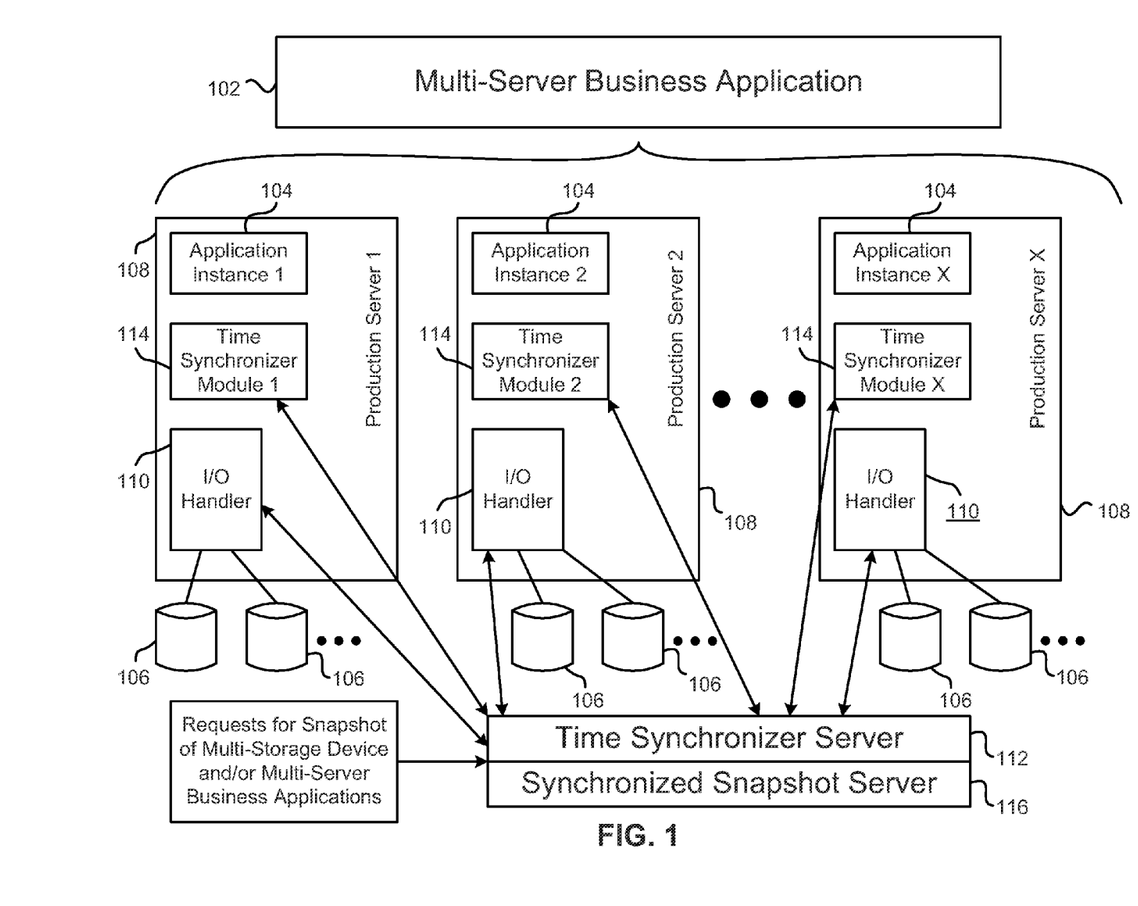
FIG. 1 is a simplified schematic diagram of a system for consistent data protection for multi-server applications according to one embodiment.

In some preferred embodiments, a novel system, method, and computer product for protecting multi-server applications may be implemented in a consistent manner. With reference to FIG. 1, a multi-server business application 102 may be comprised of multiple application instances 104, each instance running on a separate production server 108 and/or virtual server. The application instances 104 may coordinate together through a peer-to-peer, master-slave, or other architecture, as is known to one of ordinary skill in the relevant prior art to form the multi-server business application 102. A Synchronized Snapshot Server 116 may receive requests to perform snapshots of a multi-server business application 102 and may coordinate one or more I/O Handlers 110 to perform a consistent snapshot.

An I/O Handler 110 may be any driver, software, hardware, etc. module that allows, enables, or otherwise assists in effecting I/O operations between the multi-server business application 102 and data storage devices 106 and/or volumes.

In preferred embodiments, a solution may use the modules shown in FIG. 1. A Time Synchronizer Module 114 may reside in all or some production servers 108 where the application instance(s) 104 execute. The Time Synchronizer Module 114 may answer request(s) from the Time Synchronizer Server 112 to synchronize times between two or more servers associated with a given application. In addition, Time Synchronizer Modules 114 may synchronize time between themselves, independent of any server.

An I/O Handler 110 may reside in each real or virtual production server 108, in some real or virtual production servers 108, or in one real or virtual production server 108 where the application instance(s) 104 execute. The I/O Handler 110 may have the ability to intercept I/O operations (e.g., I/O requests, data transfers, etc.) from one or more application instances 104. They also can freeze all pending I/O operations on demand or upon a certain event, and hold the I/O operations frozen until it is requested to thaw the I/O operations or another certain event occurs. Freezing the I/O operations means that every pending I/O operation or every I/O operation that is sent to a specified disk will be delayed or rejected until thawed. In addition, these I/O Handlers can stretch I/O operations such that I/O operations are processed but are not allowed to complete until after some specified period of time. These I/O Handlers 110 may be utilized in a novel manner to coordinate synchronized data protection operations across multiple servers.

A Synchronized Snapshot Server 116 may reside on a separate host that may or may not be one of the production servers 108. This server can communicate with all, some and/or one of the instance(s) of the Time Synchronizer Modules 114 and/or the I/O Handlers 110. The Synchronized Snapshot Server 116 may employ the Time Synchronizer Server 112 to obtain a time value, which in some embodiments is a maximum time delta amongst all servers associated with a given application. Further, it may use this time value in performing a synchronized, I/O level consistent snapshot of the multi-volume, multi-server business application 102.

A Time Synchronizer Server 112 may run within the Synchronized Snapshot Server 116 and upon request, may drive time difference synchronizations between itself and all, some, and/or one of the Time Synchronizer Modules 114 in order to determine a time value, such as a maximum time delta, between all, some, and/or one of the server(s) 108 associated with a given application.

In particularly preferred embodiments, the application volume synchronization method does not require integration with any application interfaces in order to achieve its synchronization across multiple storage devices and multiple servers. However, there may be some times or data management points at which it is more desirable and efficient to initiate synchronization (e.g., after a completed application transaction that may involve multiple I/O operations). It is possible that only the application knows which of these points would be most beneficial to perform synchronization. This preferred embodiment can also integrate with application specific interfaces in conjunction with its own novel synchronization, to ensure synchronization is happening at an optimal point in time based on input from the application (i.e., from the application's point of view).

With continued reference to FIG. 1, a Synchronized Snapshot Server 116 may continually track an I/O Handlers 110 within its domain. It may also understand which of these I/O Handlers 110 are associated with any multi-server business applications 102. This understanding may be achieved either through manual entry and/or through automatic application resource discovery, as is known to one of ordinary skill in the relevant prior art, In addition, any associated operating system and configuration information (e.g., related WINDOWS Registry key data from MICROSOFT WINDOWS®, device configurations, etc.) as well as all, some, and/or one of the connections between the storage devices 106 and the servers 108 involved in the application may be synchronized and saved.

Synchronization can be achieved across all, some, and/or one of the I/O Handlers 110 by requesting the I/O Handlers 110 to freeze all, some, and/or one of the I/O operations on one or more storage devices 106 or volumes associated with the application. However, this method of synchronization may introduce performance problems, since each I/O Handler 110 must wait for all other I/O Handlers 110 throughout the entire duration of synchronization and snapshot initiation process, and all I/O operations may be blocked during this entire duration. This problem can be solved in the following novel way by adding a time synchronization object and by stretching I/O operations rather than freezing them.

In some embodiments, the methods disclosed herein may be included in a system. The system may comprise a processor and a computer-readable medium, the computer-readable medium having computer usable program code embodied therewith, which when executed by the processor causes the processor to: calculate a time value based on communications with the servers, the time value calculation including at least one of a latency of at least one of the communications, and a difference between a reference time clock value and a time clock value of at least one of the servers; and communicate with I/O Handlers on the servers for initiating a coordinated backup operation on the data at about a same start time.

In other embodiments, the methods disclosed herein may be included in another system. The system may comprise a time synchronizer server for communicating with time synchronizer modules on multiple servers, the time synchronizer server calculating time difference synchronizations between it and the time synchronizer modules. In addition, the system may comprise a backup server (e.g., a Synchronized Snapshot Server) for communicating with I/O Handlers on the servers for initiating a synchronized backup operation of data associated with an application running on the servers at about a same point in time, a start time of the synchronized backup operation being based at least in part on the time difference synchronizations calculated by the time synchronizer server. Note that the Time Synchronizer Server and the Backup Server may reside on the same host or different hosts. Moreover, the Time Synchronizer Server may be a subcomponent of the Backup Server.

Figure 2:
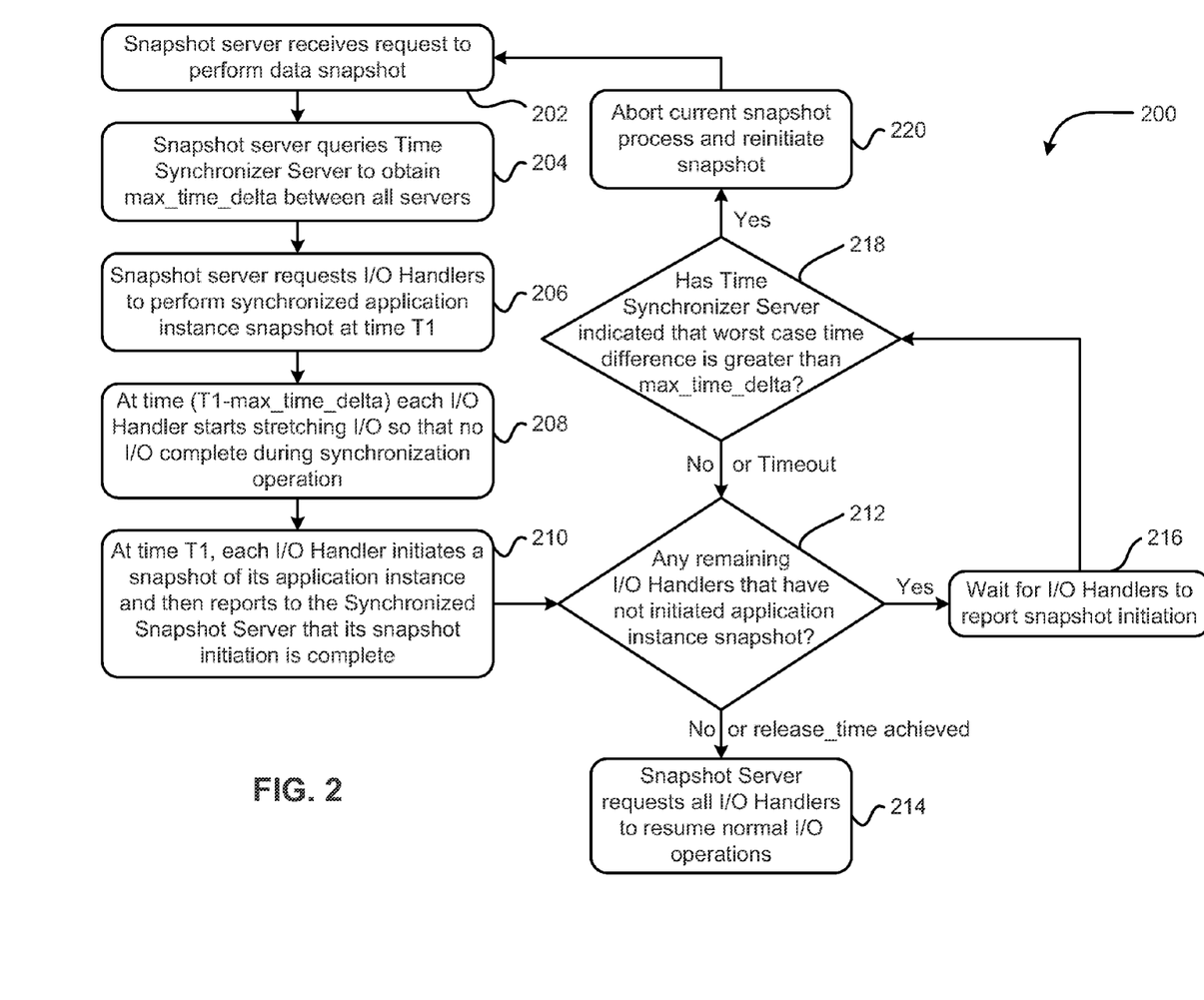
FIG. 2 shows a flowchart of a method according to one embodiment.

Now referring to FIG. 2, a process flowchart for achieving synchronization and performing a consistent backup across multiple storage devices and multiple servers associated with an application via stretching I/O operations is shown. This method 200 may be carried out in the context of functionality of FIG. 1. Of course, the method 200 may be carried out in any desired environment, and is not limited to being used in relation with FIG. 1.

The operations shown in FIG. 2 are for explanatory purposes only, and additional or less operations may be included in any embodiment, Also, some operations may be removed, altered, or modified depending on the desired outcome. For example, in some embodiments, operations 202, and 210 may comprise a fully operational and functional method of obtaining a snapshot of the data.

In operation 202, the Synchronized Snapshot Server may receive a request to perform a synchronized data backup of a multi-device, multi-server business application. According to some embodiments, the backup operation may be a snapshot of the data, and for the sake of simplicity, backup operations described herein may be referred to as snapshots. However, this does not limit the scope of the invention, which includes the ability to make backups of data and snapshots of data. The request may be initiated by user input, from a scheduling module, by the occurrence of a predetermined event, by the passage of a predetermined amount of time, by the unsuccessful conclusion of a prior snapshot attempt, etc.

In some embodiments, the backup operation may be initiated without communication with the multi-server business application.

In operation 204, the Synchronized Snapshot Server may query the Time Synchronizer Server to obtain a time value, a time value such as max_time_delta, to use for synchronization across all devices and servers associated with a specified application. According to some embodiments, the time value may be a normalized value of time clock differences and latencies across all the servers associated with the application, such that it represents a maximum deviation of time required for all the involved servers to synchronize. The time value may be calculated as described in the "Determination of the Time Value" section below.

In operation 206, the Synchronized Snapshot Server may request that all I/O Handlers perform a synchronized application instance snapshot via stretching I/O operations at a specified time, such as T1. This snapshot may be performed by sending out asynchronous commands, such as Initiate_Stretch_IO_Snapshot commands, to all, some, or one I/O Handlers associated with the application. T1, the time value, a list of which disks and/or volumes to snapshot, and other pertinent data may be passed to each I/O Handler with the asynchronous commands.

In some embodiments, some object other than the I/O Handler may initiate a snapshot of an application instance associated with the I/O Handler. In other embodiments, the I/O Handler which froze or stretched the I/O operations may initiate the snapshot on its application instance.

For example, a request to access data from a hard disk drive may be interrupted and stopped by the freezing process, such that the hard disk drive is not accessed and is not searched for the data requested. In another example, a request to output a document to a printer queue may be interrupted and held during the freezing process such that a document is not output to the printer, but after the freezing process has been completed, the document may then be sent to the printer queue to be printed.

One example of the stretching process might be where a request is received to write a file to a hard disk, where the writing is allowed to begin, so that a substantial portion of the file may be written to the hard disk, but is not allowed to complete until after the stretching process is completed. Once the stretching process has completed, the rest of the file may be written to the hard disk, which can then reflect the presence of the new file. Another example might be where a request to copy data from a CD-ROM onto a hard disk is received, where during the stretching process, the data may be read from the CD-ROM, but may not be written to the hard disk until after the stretching process has ended.

Many more freezing and stretching embodiments are possible, and the foregoing examples are not meant to limit the invention in any manner, but are presented by way of example only.

In operation 208, at a predetermined time, such as T1 minus the time value, according to its own servers' time clock, each I/O Handler may start to stretch communication with every I/O operation it receives for any volumes and/or disks that it controls that are associated with the application being protected. In some embodiments, the I/O Handlers may stretch communication between instances of the multi-server business application and data storage volumes or disks associated therewith during initiating of the backup operation. In other embodiments, the I/O Handlers may not freeze the communication between application instances and data storage volumes and/or disks associated therewith during initiating of the backup operation.

In some embodiments, the stretch I/O process may allow I/O operations to initiate, but it may not allow them to end until the stretching period is over. The stretch I/O process may be continued until the passage of a certain amount of time, such as the amount of time up to T1 plus the time value (which may be the maximum time delta, according to some embodiments), such that the I/O stretch time is more than or equal to two times the time value, as shown in Equation 1.

$$(IO\_end\_time - IO\_start\_time) \geq (2 * time\_value) \quad \text{Equation 1}$$

The time value, according to some embodiments, may be the 'worst case' difference time to synchronize between any two servers. The length of time from when the earliest server starts its stretch I/O process, the IO_start_time, to when the latest server finishes its stretch I/O process, the release_time, may be two times the time value, such as the maximum time delta (max_time_delta). By stretching I/O operations for (2*max_time_delta), a cross server consistent state may be achieved with a consistent image of application data across all I/O operations across all involved servers. The I/O Handlers may further tag (with IO_start_time) and may monitor all I/O operations that are received during the stretch I/O period. The I/O Handler can then release individual I/O operations (i.e., stop stretching that I/O operation and allow it to complete) at another time, as shown in Equation 2.

$$release\_time = IO\_start\_time + (2 * max\_time\_delta) \quad \text{Equation 2}$$

By performing stretching for the period of time until the release_time is reached, synchronization across all servers at the individual I/O level may be achieved with substantial certainty.

In some approaches, the stretching may be initiated from about the start time (for example, IO_start_time) minus a time value (for example, max_time_delta). In more approaches, the stretching may be terminated after about the start time plus the time value.

In operation 210, at a predetermined time, such as time T1, every I/O Handler may initiate a snapshot on any or all volumes it controls that are associated with the application. Every I/O Handler may report back to the Synchronized Snapshot Server that snapshot initiation is complete once initiation is completed. In some preferred embodiments, each I/O Handler may initiate a backup operation within the same window of synchronization, e.g., the backup operations at each server may be initiated within an extremely short time from each other.

In operation 212, the Synchronized Snapshot Server may wait for all I/O Handlers to report back that snapshot initiation completion has been achieved. The Synchronized Snapshot Server may have a time out value that prevents it from remaining in a wait state in the event of some lost communications or other failure with the I/O Handlers.

In operation 214, if all snapshot initiations on any or all I/O Handlers associated with the application are complete, the Synchronized Snapshot Server may resume normal operation. In addition, all I/O Handlers may resume normal I/O operations at release_time as defined in Equation 2. Notice that throughout the entire operation, according to some embodiments, no I/O operations were stopped, instead I/O operations were only stretched. Further, in other embodiments, I/O Handlers may process I/O operations during the stretch period and delay only the I/O completion until after release_time. This provides further efficiencies by enabling very fast I/O completion at release_time for stretched I/O operations.

In operation 216, if any of the I/O Handlers have not reported that initiation of application instance snapshot has occurred, the Synchronized Snapshot Server may wait for all I/O Handlers to report back that snapshot initiation has occurred. If a timeout value has been reached, the Synchronized Snapshot Server may continue to operation 218 without waiting any further.

In operation 218, the Time Synchronizer Server may determine if a worst case time difference is greater than a time value, such as max_time_delta. If not, the method 200 returns to operation 212, If the worst case time difference is greater than a time value, then the method 200 continues to operation 220, where the current snapshot process may be aborted, and the snapshot process reinitiated at operation 202.

Determination of Time Value

One aspect of some preferred embodiments is the determination of a time value which represents a difference in time between all the various servers associated with a given application. One method of determining a suitable time value, according to one approach, is described herein, For simplicity, the time value will be referred to as a variable, max_time_delta, but this in no way limits the scope of the invention, and is included as an example of a variable name for the time value only. Other suitable implementations for determining the time value might be used without reducing the scope of the invention.

Upon request or after the occurrence of a predetermined event, be Time Synchronizer Server may determine a max_time_delta between all servers. There are three elements incorporated into the max_time_delta: 1) time clock differences between the servers associated with a given application to be synchronized, 2) communication latencies between those servers, and 3) a factor K as described below. Note that the max_time_delta determination, according to some embodiments, does not necessarily need to resolve time clock differences and latency issues between servers. What the max_time_delta represents may be a time value within which data synchronization across multiple servers may be achieved, given time clock differences and latency issues.

Within the Synchronized Snapshot Server there may be a Time Synchronizer Server which determines a max_time_delta for a given application through cooperation with the Time Synchronizer Modules on any or all the servers associated with the application.

According to some embodiments, the Time Synchronizer Server may query its own server's clock for Time of Day, $T_0$. This time is typically available down to $\frac{1}{100}$ of a second or even less. All calculations for the max_time_delta may be determined based on the server clock on the Time Synchronizer Server. Other embodiments may determine max_time_delta based on some other server clock standard or other means.

The Time Synchronizer Server may send a time synchronization check request, such as Time_Synchronization_Check, to any or all Time Synchronizer Modules on all servers associated with a given application. The time synchronization check request may include $T_0$ for later reference. The Time Synchronizer Server may also wait for responses from the Time Synchronizer Modules.

Each Time Synchronizer Module may receive the time synchronization check request, immediately query its own server's clock for Time of Day, $T_x$, and may return this time to the Time Synchronizer Server. When a Time Synchronizer Module returns a response, the Time Synchronizer Server may process it. Almost immediately, the Time Synchronizer Server may again query its own server's clock for Time of Day, $T_1$. A gross latency for that specific Time Synchronizer Module, $L_x$ may then be calculated according to Equation 3.

$$L_x = T_1 - T_0. \quad \text{Equation 3}$$

A more precise representation of latency between the server and this module can be achieved by going through the above process many ('n') times in an iterative process and averaging out the observed latency according to Equation 4.

$$L\_Ave_x = (S_{1-n}L_X)/n \quad \text{Equation 4}$$

An Average Time Difference, such as $TD\_Ave_x$, between that Time Synchronizer Module and the Time Synchronizer Server may also be calculated using an average of two Time Differences, $TD_{x1}$ and $TD_{x2}$. These times may be calculated as the absolute values of the difference between the two servers' time of day clock queries according to Equation 5.

$$TD_{x1} = |T_x - T_0| \text{ and } TD_{x2} = |T_1 - T_x| \quad \text{Equation 5}$$

These Time Differences may inherently include the partial latency (i.e., the 1 way communication) between the Time Synchronizer Server and that Time Synchronizer Module. The two Time Differences may then be averaged according to Equation 6.

$$TD\_Ave_x = (TD_{x1} + TD_{x2})/2 \quad \text{Equation 6}$$

The absolute value of the differences may be taken to cover the possibility of the server clocks on the Time Synchronizer Server and the Time Synchronizer Module being slightly out of synchronization (for example, such that $T_x$ appears to be a time prior to $T_0$). Gross time differences (e.g., the Time of Day clocks are incorrectly set) may be handled by rejecting $TD_x$ values that are larger than some reasonable clock difference. The average may be taken to normalize the clock differences between the two servers by comparing the time from the Time Synchronizer Module with the beginning and end times of the Time Synchronizer Server.

While calculating the $TD_{x1}$ and $TD_{x2}$ for all Time Synchronizer Modules associated with an application, the Time Synchronizer Server may track the max_time_delta. The largest max_time_delta at any given time may be used as a worst case time difference value, which can be represented for the sake of clarity as worst_case_time_difference. By further evaluating these values, a determination may be made more precisely as to how close the two different servers' time clocks are. This may be possible by observing that, if the two time clocks on the two servers were completely synchronized, then $T_0$ plus $TD\_Ave_x$ would be very close to $T_x$. Knowing this relationship, the difference in time between them can be observed. By calculating this many times and iteratively averaging the difference in time, an approximation of the time difference between the two servers can be made.

When all Time Synchronizer Modules have reported back in, the Time Synchronizer Server may use the worst case time difference value, worst_case_time_difference, which may be calculated for any of the modules. As described above, this worst case time difference may normalize both communications latencies and time differences between all involved servers and may represent this value as a maximum synchronization period required to achieve synchronization across servers. This method will work for all cases except if there is a sudden, unexpected and significant increase in communications latencies. This situation could potentially result, for example, in the I/O Handlers not receiving their instructions to stretch I/O until after time (T1−max_time_delta). This situation may be handled by introducing an additional factor K such that the max_time_delta is adjusted to equal factor K multiplied by the worst case time difference.

The factor K may be manually or dynamically adjusted throughout the application life time. The max_time_delta may then be returned by the Time Synchronizer Server back to the Synchronized Snapshot Server for use in the initiation of the snapshot process. However, the Time Synchronizer Server may continue to monitor the value of the worst_case_time_difference throughout the entire snapshot initiation period. While the I/O Handlers stretch I/O and perform the synchronized snapshots, the Time Synchronizer Server may continue working with the Time Synchronizer Modules to continually check the worst_case_time_difference. If at any time during the snapshot initiation process the worst_case_time_difference becomes greater than max_time_delta, that is, the max_time_delta being used in the current snapshot synchronization process, then this indicates that there may be some significant new latency that could compromise the synchronization. If this is the case, the Time Synchronizer Server may notify the Synchronized Snapshot Server that the snapshot should be reinitiated and the Synchronized Snapshot Server may abort the current snapshot and may reinitiate it with the max_time_delta, calculated with the newer, worst_case_time_difference.

While various embodiments have been described above, it should be understood that they have been presented by way of example only, and not limitation, Thus, the breadth and scope of a preferred embodiment should not be limited by any of the above-described exemplary embodiments, but should be defined only in accordance with the following claims and their equivalents.

What is claimed is:

1. A method, comprising:
receiving a request to perform a backup of data associated with an application running on multiple servers;
communicating with I/O Handlers on the servers for initiating a coordinated backup operation on the data at a substantially same start time; and
instructing the I/O Handlers to stretch communication between instances of the application and data storage volumes associated therewith during initiating the backup operation.

2. The method of claim 1, wherein I/O Handlers process I/O operations during the stretching and complete I/O operations after the stretching is terminated.

3. The method of claim 1, further comprising calculating a time value based on communications with the servers, the time value calculation including at least one of a latency of at least one of the communications, and a difference between a reference tune clock value and a time clock value of at least one of the servers, wherein the stretching is initiated from about the start time minus the time value.

4. The method of claim 1, further comprising calculating a time value based on communications with the servers, the time value calculation including at least one of a latency of at least one of the communications, and a difference between a reference time clock value and a time clock value of at least one of the servers, wherein the stretching is terminated after about the start time plus the time value.

5. The method of claim 1, further comprising receiving confirmation that the I/O Handlers have initiated the backup operation, and after receiving the confirmation that the I/O Handlers have initiated the backup operation, instructing the I/O Handlers to resume normal operations.

6. The method of claim 1, further comprising calculating a time value based on communications with the servers, the time value calculation including at least one of a latency of at least one of the communications, and a difference between a reference time clock value and a time clock value of at least one of the servers, wherein the time value represents a maximum deviation of time for the servers to synchronize.

7. The method of claim 1, wherein the I/O Handlers do not freeze communication between instances of the application and data storage volumes associated therewith during initiating the backup operation.

8. The method of claim 1, wherein the backup operation is a snapshot of the data.

9. The method of claim 1, wherein the backup operation is initiated without communication with the application.

10. The method of claim 1, further comprising instructing the I/O Handlers to stretch write operations during initiating the backup operation, wherein read operations are served normally.

11. A method, comprising:
receiving a request to perform a backup of data associated with an application running on multiple servers; and
instructing I/O Handlers on the servers to initiate a coordinated backup operation on the data at a substantially same start time,
wherein the I/O Handlers stretch communication between instances of the application and data storage volumes associated therewith during initiating the backup operation.

12. The method of claim 11, further comprising calculating a time value based on communications with the servers, wherein the time value represents a maximum deviation of time for the servers to synchronize, wherein the stretching is initiated from about the start time minus the time value.

13. The method of claim 11, calculating a time value based on communications with the servers, wherein the time value represents a maximum deviation of time for the servers to synchronize, wherein the stretching is terminated after about the start time plus the time value.

14. The method of claim 11, further comprising receiving confirmation that the I/O Handlers have initiated the backup operation, and after receiving the confirmation that the I/O Handlers have initiated the backup operation, instructing the I/O Handlers to resume normal operations.

15. The method of claim 11, wherein the I/O Handlers do not freeze communication between instances of the application and data storage volumes associated therewith during initiating the backup operation.

16. The method of claim 11, wherein I/O Handlers process I/O operations during the stretching and complete I/O operations after the stretching is terminated.

17. The method of claim 11, wherein the backup operation is initiated without communication with the application.

18. A computer program product, comprising:
   a non-transitory computer usable medium having computer usable program code embodied therewith, the computer usable program code comprising:
      computer usable program code configured to communicate with I/O Handlers on the servers for initiating a coordinated backup operation on the data at a substantially same start time; and
      computer usable program code configured to instruct the I/O Handlers to stretch communication between instances of the application and data storage volumes associated therewith during initiating the backup operation.

19. The computer program product of claim 18, further comprising computer usable program code configured to calculate a time value based on communications with multiple servers, wherein the time value represents a maximum deviation of time for the servers to synchronize with a backup server that communicates with I/O Handlers on the servers about asynchronously for initiating the coordinated backup operation on the data within the same window of synchronization.

20. The computer program product of claim 18, wherein the I/O Handlers do not freeze communication between instances of the application and data storage volumes associated therewith during initiating the backup operation.

21. A system, comprising:
   a processor;
   a non-transitory computer usable medium, the computer usable medium having computer usable program code embodied therewith, which when executed by the processor causes the processor to:
      communicate with I/O Handlers on the servers for initiating a coordinated backup operation on the data at a substantially same start time; and
      instruct the I/O Handlers to stretch communication between instances of the application and data storage volumes associated therewith during initiating the backup operation.

22. A system, comprising:
   a backup server for communicating with I/O Handlers on the servers for initiating a synchronized backup operation of data associated with an application running on the servers at a substantially same point in time, a start time of the synchronized backup operation being based at least in part on the time difference synchronizations calculated by the time synchronizer server, wherein the backup server includes a non-transitory computer usable medium comprising computer code for instructing the I/O Handlers to stretch communication between instances of the application and data storage volumes associated therewith during initiating the backup operation.

23. The system of claim 22, wherein the backup operation is a snapshot of the data associated with the application.

\* \* \* \* \*